Sept. 8, 1942.                R. J. MILLER                2,295,503
                                  BRAKE
                         Filed Sept. 19, 1940

INVENTOR.
RAYMOND J. MILLER
BY
ATTORNEY.

Patented Sept. 8, 1942

2,295,503

UNITED STATES PATENT OFFICE 2,295,503

BRAKE

Raymond J. Miller, Detroit, Mich., assignor to Hydraulic Brake Company, Detroit, Mich., a corporation of California Application September 19, 1940, Serial No. 357,494

4 Claims. (Cl. 188—186)

This invention relates to brakes, and more particularly to centrifugal brakes.

Broadly the invention comprehends a simple brake structure of the centrifugal type operative to function indirectly in relation to the speed required.

An object of the invention is to provide a centrifugal brake for a rotatable member operative to oppose rotation of the member indirectly to the speed thereof.

Another object of the invention is to provide a brake structure interposed between a fixed and a rotatable member operative to engage the fixed member at low speed of the rotatable member and to release the fixed member gradually as the speed of the rotatable member increases.

Another object of the invention is to provide a brake structure including a shoe having means for wiping the braking surface.

Other objects and advantages of the invention will appear from the following description taken in connection with the drawing forming a part of this specification, and in which—

Figure 1:
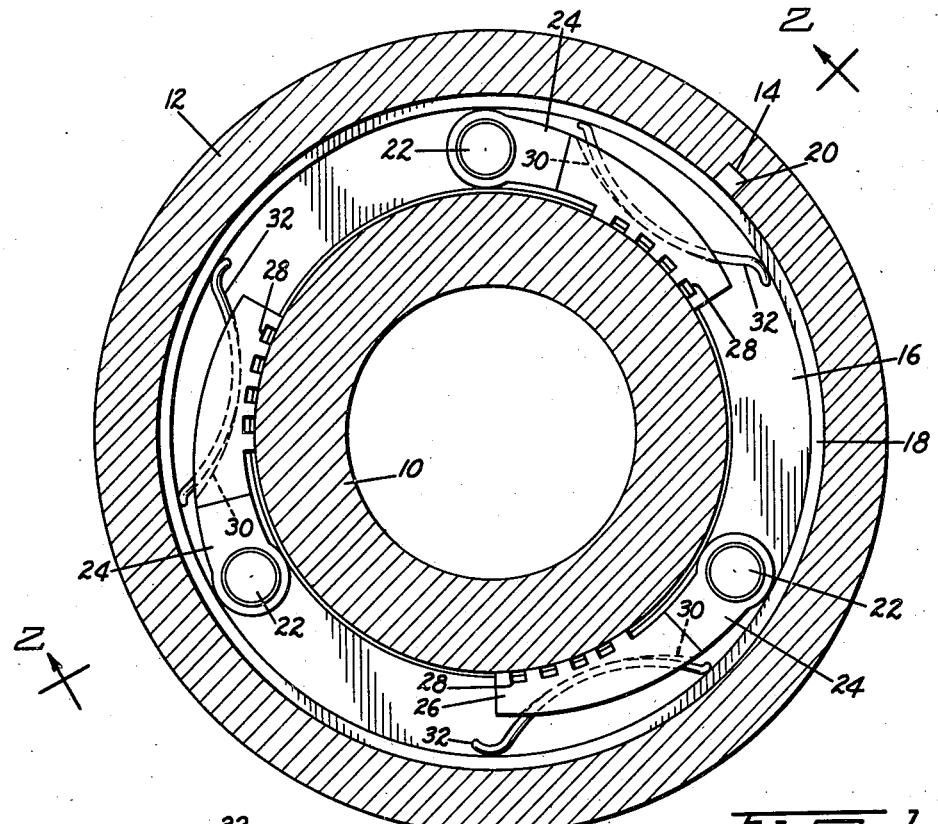
Fig. 1 is a vertical sectional view of a fixed and a rotatable member illustrating the invention as applied.
Figure 2:
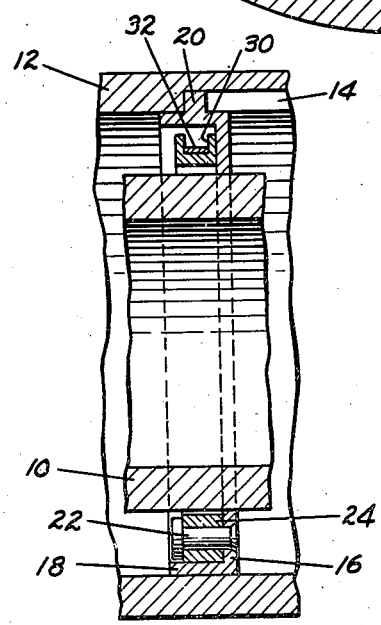
Fig. 2 is a sectional view substantially on line 2—2, Fig. 1.
Figure 3:
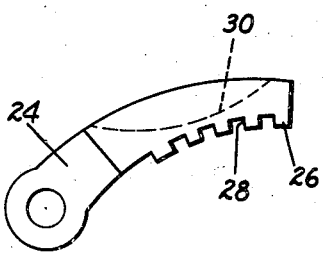
Fig. 3 is a detail view illustrating one of the brake shoes.

One of the most important factors to be reckoned with in the manufacture of a centrifugal brake for certain functions is the limited space that may be occupied by the brake, and, accordingly, the desirability of reducing the number of the component parts thereof to a minimum, and also to simplify the structure of each part so that the cost of production and assembly may be greatly reduced. With this in view the instant invention aims to provide a centrifugal brake having but few parts, that may be cheaply made, easily and quickly assembled and will produce very accurate results as to its braking force.

In an illustrated embodiment of the invention, 10 represents a fixed support. As shown, this support is a hollow spindle that may be an element in most any apparatus, such as, for example, a torque converter. A cylindrical rotatable member 12 is sleeved over the fixed member 10 and suitably supported concentrically of and in spaced relation thereto. The rotatable member has an internal longitudinal groove 14, the object of which will hereinafter appear.

A ring 16 has a marginal flange 18 commensurate with the inner diameter of the rotatable member 12, and supported on the flange 18 is a boss 20. The ring is fitted into the rotatable member 12, and the boss 20 on the flange 18 is received by the groove 14 in the wall of the rotatable member so as to secure the rotatable member and ring against relative movement.

A plurality of fixed anchors 22 are arranged on the ring 16 in spaced relation to one another, and corresponding interchangeable friction elements or shoes 24 are pivoted on the anchors for cooperation with the fixed member 10.

Each of the shoes 24 includes a segment 26 complementary to the circumference of the fixed member 10, and the segment has a plurality of equi-spaced transversely disposed channels or grooves 28 providing a serrated face adapted to wipe the braking surface. Each shoe has in its back a socket or recess 30, and a flat spring 32 seated in the recess has its respective ends slidably engaging the flange 18 on the ring 16 so as to normally retain the shoe against the braking surface of the stationary member 10.

As the speed of the rotatable member 12 increases, centrifugal force tends to lift the shoes from the braking surface of the fixed member 10 until such a point is reached that the shoes are ineffective for retarding rotation of the rotatable member 12. Thus it is clear that the brake is operative to function indirectly in relation to the speed required.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake for a rotatable element comprising a carrier secured to the rotatable element, a shoe pivoted to the carrier for cooperation with a fixed element, a serrated braking face on the shoe and means resiliently retaining the shoe in engagement with the fixed element.

2. A brake for a rotatable element comprising a ring secured to the rotatable element, a plurality of shoes pivoted on the ring for cooperation with a fixed element, serrated faces on the shoes and resilient members normally retaining the shoes in engagement with the fixed element.

3. A brake for a rotatable element comprising a plurality of shoes pivoted on the element, transversely serrated wiping means on the engaging faces of the shoes, resilient members between the shoes and the element, and a stationary cylindrical member for reception of the shoes.

4. A brake for a rotatable element comprising a ring having a peripheral flange extended from one side thereof, means for securing the ring to the rotatable element for rotation therewith, a plurality of shoes pivoted on the ring for cooperation with a fixed element, said shoes having sockets in the backs thereof and spaced transverse channels on their braking faces, and springs seated in the sockets slidably engaging the flange.

RAYMOND J. MILLER.